(12) United States Patent
Kawakami (10) Patent No.: US 11,070,746 B2
(45) Date of Patent: Jul. 20, 2021

(54) IMAGE CAPTURING APPARATUS, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Masashi Kawakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/941,228

(22) Filed: Jul. 28, 2020

(65) Prior Publication Data

US 2021/0058565 A1 Feb. 25, 2021

(30) Foreign Application Priority Data

Aug. 22, 2019 (JP) .............................. JP2019-151862

(51) Int. Cl.
| | | |
|---|---|---|
| *H04N 5/262* | (2006.01) | |
| *H04N 5/232* | (2006.01) | |
| *H04N 19/146* | (2014.01) | |
| *H04N 19/147* | (2014.01) | |
| *H04N 19/167* | (2014.01) | |
| *H04N 19/00* | (2014.01) | |
| *G06T 9/00* | (2006.01) | |
| *G06F 40/146* | (2020.01) | |

(52) U.S. Cl.
CPC ....... *H04N 5/2628* (2013.01); *H04N 5/23229* (2013.01); *H04N 5/23293* (2013.01)

(58) Field of Classification Search
CPC ............. H04N 5/2628; H04N 5/23229; H04N 5/23293; H04N 19/00; H04N 19/112; H04N 19/146; H04N 19/15; H04N 19/147; H04N 19/17; H04N 19/167; G06T 9/00
USPC ... 348/222.1, 333.01, 333.02, 333.11, 14.13, 348/387.1, 390.1; 382/232, 233, 235; 375/240.25; 386/232, 233, 235
See application file for complete search history.

(56) References Cited

U.S. PATENT DOCUMENTS

| | | | | |
|---|---|---|---|---|
| 2013/0251257 A1* | 9/2013 | Ohnishi | .................... | G06T 9/00 382/166 |
| 2015/0334296 A1* | 11/2015 | Gunji | ................. | H04N 5/23229 386/224 |
| 2016/0323582 A1* | 11/2016 | Takeda | ................... | H04N 19/14 375/240.12 |

(Continued)

FOREIGN PATENT DOCUMENTS

| | | |
|---|---|---|
| JP | 2009-267893 A | 11/2009 |
| JP | 2016-213527 A | 12/2016 |

*Primary Examiner* — Marly S Camargo (74) *Attorney, Agent, or Firm* — Canon U.S.A., Inc. IP Division (57) ABSTRACT

An image capturing apparatus includes an image capturing unit configured to capture an image of an object and generate image data, a compression unit configured to compress the image data generated by the image capturing unit, a display control unit configured to decode the image data compressed by the compression unit and display the decoded image data on a display unit, and an instruction unit configured to issue an instruction to magnify an image to be displayed on the display unit, wherein, in a case where the instruction unit issues the instruction to magnify the image to be displayed on the display unit, the compression unit reduces a compression rate of the image data.

10 Claims, 7 Drawing Sheets

(56) References Cited

U.S. PATENT DOCUMENTS

2019/0332235 A1\* 10/2019 Miyoshi ................ G06F 3/0485
2019/0356919 A1\* 11/2019 Kaneko ................ H04N 19/176

\* cited by examiner

FIG.3A
NORMAL LV DISPLAY

FIG.3B
MAGNIFICATION OPERATION

FIG.3C
MAGNIFIED IMAGE DISPLAY

IMAGE CAPTURING APPARATUS, METHOD OF CONTROLLING IMAGE CAPTURING APPARATUS, AND STORAGE MEDIUM

BACKGROUND

Field of the Disclosure

The present disclosure relates to an image capturing apparatus, a method of controlling the image capturing apparatus, and a storage medium.

Description of the Related Art

In recent years, an increasing amount of data is output from a sensor of an image capturing apparatus, such as a digital camera or digital camcorder, due to an increased resolution, an increased frame rate, and an increased number of bits, and this results in a tight transmission bandwidth. Accordingly, a technique for easing a bandwidth by encoding data output from a sensor has been discussed (refer to, for example, Japanese Patent Application Laid-Open No. 2016-213527).

Further, in recent years, many image capturing apparatuses are equipped with an electronic viewfinder (EVF) or a monitor so that a user can capture an image while checking the image with the EVF or the monitor. However, it is often difficult to check whether an image is in focus using a monitor that has a small screen size. Thus, a technique for magnifying a region of interest to check whether an image is in focus is also discussed (refer to, for example, Japanese Patent Application Laid-Open No. 2009-267893).

The conventional techniques can ease a bandwidth by encoding data output from a sensor. However, when a user performs a magnification operation to check whether an image is in focus, an encoding distortion becomes visible, if the encoding is applied to an image to be displayed on an EVF or a monitor.

SUMMARY

Embodiments of the present disclosure are directed to a technique for reducing visibility of an encoding distortion in a magnified image display while preventing an increase in data amount.

According to embodiments of the present disclosure, an image capturing apparatus includes an image capturing unit configured to capture an image of an object and generate image data, a compression unit configured to compress the image data generated by the image capturing unit, a display control unit configured to decode the image data compressed by the compression unit and display the decoded image data on a display unit, and an instruction unit configured to issue an instruction to magnify an image to be displayed on the display unit, wherein, in a case where the instruction unit issues the instruction to magnify the image to be displayed on the display unit, the compression unit reduces a compression rate of the image data.

Further features of the present disclosure will become apparent from the following description of exemplary embodiments with reference to the attached drawings.

DESCRIPTION OF THE EMBODIMENTS

A first exemplary embodiment of the present disclosure will be described below with reference to the drawings.

Figure 1:
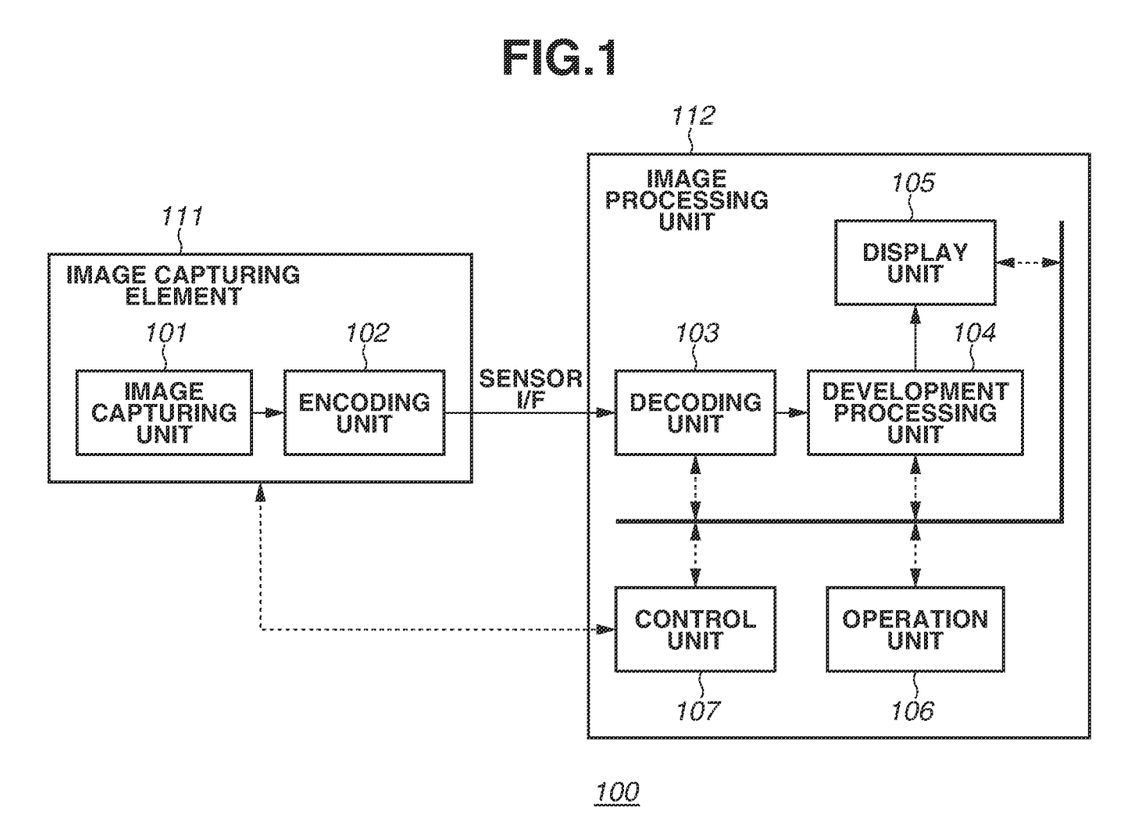
FIG. 1 is a block diagram illustrating an example of a configuration of an image capturing apparatus according to a first exemplary embodiment.

FIG. 1 is a block diagram illustrating an example of a configuration of an image capturing apparatus 100 according to the present exemplary embodiment.

As illustrated in FIG. 1, the image capturing apparatus 100 includes an image capturing element 111 and an image processing unit 112. The image capturing element 111 includes an image capturing unit 101 and an encoding unit 102. The image processing unit 112 includes a decoding unit 103, a development processing unit 104, a display unit 105, an operation unit 106, and a control unit 107.

A configuration of the image capturing element 111 will be described below.

The image capturing unit 101 includes a lens optical system and an image sensor, such as a charge-coupled device (CCD) image sensor or complementary metal oxide semiconductor (CMOS) sensor. The lens optical system includes an optical lens, a diaphragm, a focus control unit, and a lens driving unit, and is able to perform optical zooming. The image sensor converts optical information from the lens optical system into an electric signal. The image capturing unit 101 generates image data by converting the electric signal acquired by the image sensor into a digital signal.

The encoding unit 102 encodes the image data generated by the image capturing unit 101 to reduce a data amount and outputs the encoded data to the image processing unit 112 via a sensor interface (sensor I/F).

A configuration of the image processing unit 112 will be described below.

The control unit 107 controls the entire image capturing apparatus 100. The decoding unit 103 decodes the encoded data input from the image capturing element 111 via the sensor I/F. The development processing unit 104 performs development processing, such as demosaicing processing, noise reduction processing, optical distortion correction processing, and color correction processing, on the decoded image data.

The display unit 105 is a display apparatus attached to the image capturing apparatus 100, such as a monitor or electronic viewfinder (EVF), and displays an image developed by the development processing unit 104. The display unit 105 displays an image so that a user can check an image to be captured. The operation unit 106 is a user interface via which the user inputs an instruction to the image capturing apparatus 100. In a case where a touch panel is mounted on the display unit 105, the user can input an instruction via a button displayed on the monitor of the display unit 105.

Further, physical buttons, a stick, a shutter button, and a menu button attached to the image capturing apparatus 100 are also part of the operation unit 106.

A process that is performed by the control unit 107 of the image capturing apparatus 100 will be described below based on a flowchart illustrated in FIG. 2 with reference to FIGS. 1, 3A, 3B, and 3C. Specifically, a control process that is performed when the image capturing apparatus 100 is turned on and the display unit 105 displays an object to be captured and the image is magnified and displayed based on a user operation will be described below.

Figure 2:
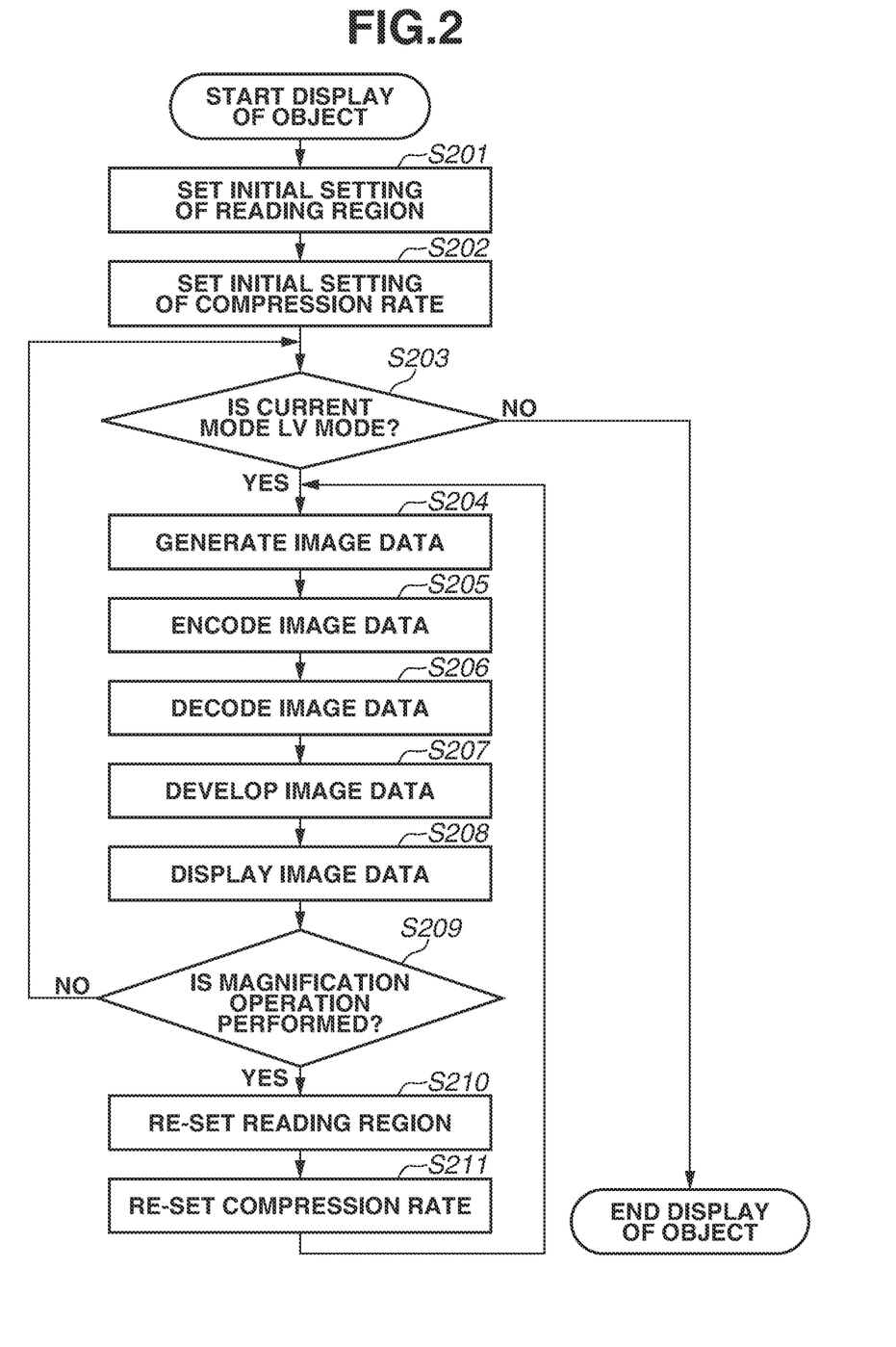
FIG. 2 is a flowchart illustrating an example of a process of displaying a magnified image of an object according to the first exemplary embodiment.

FIG. 2 is a flowchart illustrating an example of a process of displaying a magnified image of an object according to the present exemplary embodiment.

In step S201, the control unit 107 sets an initial setting of a reading region for image capturing from an effective pixel region of the image sensor of the image capturing unit 101. In the initial setting, a maximum recording pixel region is set as the reading region.

In step S202, the control unit 107 sets an initial setting of a compression rate of the encoding unit 102. In this processing, the compression rate is determined so that a data amount of output data from the image capturing element 111, which is determined based on the reading region determined in step S201 and a frame rate read from the image capturing unit 101, becomes a data amount that can be transmitted from the sensor I/F.

For example, in a case where an image is displayed at a high frame rate on the monitor or the EVF, the displayed image is not likely to appear unnatural to the user. To realize such a display, however, a significant amount of data is transmitted via the sensor I/F, and if the amount exceeds the transmission capacity of the sensor I/F, an adequate frame rate is no longer maintained. Thus, the compression rate is set to, for example, ½ to reduce the data amount, so that data can be transmitted while a high frame rate is maintained.

In step S203, the control unit 107 determines whether a current mode is a live view (LV) mode in which the user can check an object from the monitor or the EVF. In a case where the control unit 107 determines that the current mode is not the LV mode (e.g., the current mode is a reproduction mode) (NO in step S203), the process ends. On the other hand, in a case where the control unit 107 determines that the current mode is the LV mode (YES in step S203), the processing proceeds to step S204. The process also ends when a power source of the image capturing apparatus 100 is turned off.

In step S204, the image capturing unit 101 generates image data in the reading region set in step S201 or a reading region set in step S210 described below. Then, in step S205, the encoding unit 102 encodes the generated image data at the compression rate set in step S202 or a compression rate set in step S211 described below, and outputs the encoded data to the image processing unit 112 via the sensor I/F.

In step S206, the decoding unit 103 decodes the encoded data output via the sensor I/F. In step S207, the development processing unit 104 develops the image data decoded in step S206. In step S208, the control unit 107 performs display control to display the image data developed in step S207 on the monitor or the EVF that is the display unit 105.

Figure 3A:
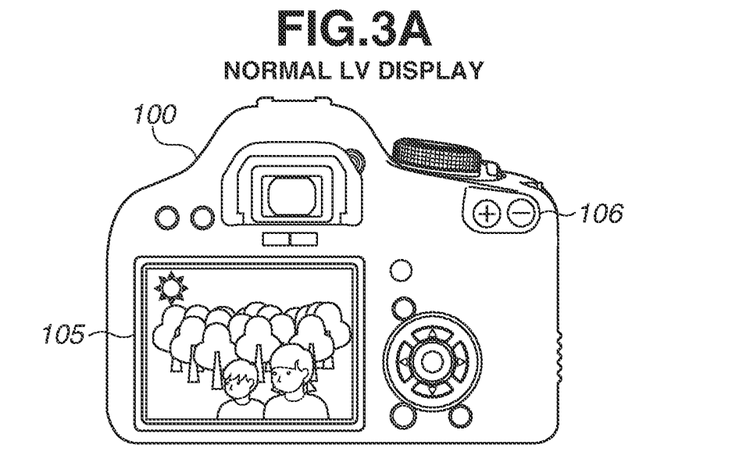
FIGS. 3A, 3B, and 3C illustrate a user operation of magnifying an image.

FIG. 3A illustrates a state where an image including an object is displayed without being magnified on the monitor that is the display unit 105 of the image capturing apparatus 100. A magnification (+) button and a reduction (−) button are provided at an upper right portion of the image capturing apparatus 100 as part of the operation unit 106. When a magnification operation is not performed by the user, an image including an object is displayed without being magnified.

Figure 3B:
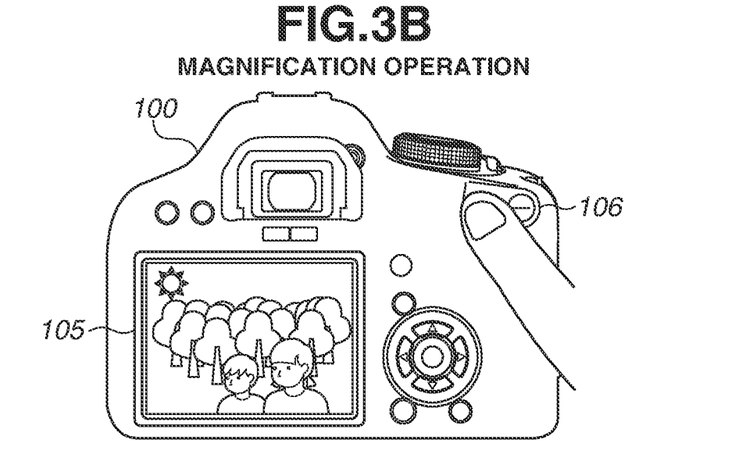

In step S209, the control unit 107 determines whether an instruction to magnify the image is received from the operation unit 106 based on the magnification operation by the user. FIG. 3B illustrates a state where the magnification operation is performed by the user. In a state where the image including the object is displayed on the display unit 105, the user may perform an operation to magnify the image in order to, for example, check whether the object is in focus. The user operates the magnification (+) button to transmit an instruction to magnify the image from the operation unit 106 to the control unit 107. In step S209, in a case where the control unit 107 determines that an instruction to magnify the image is received from the operation unit 106 (YES in step S209), the processing proceeds to step S210. On the other hand, in a case where the control unit 107 determines that an instruction to magnify the image is not received from the operation unit 106 (NO in step S209), the processing returns to step S203 to process the next frame.

In step S210, the control unit 107 re-sets a reading region of the image sensor of the image capturing unit 101 based on a magnification rate specified by the operation unit 106. In a case where the magnification operation is performed, the reading region becomes smaller than the reading region set in step S201. Consequently, the amount of data output from the image capturing unit 101 of the image capturing element 111 decreases. Further, the magnification rate is determined based on the magnification operation by the user. For example, the control unit 107 determines the magnification rate based on the length of time when the magnification (+) button is operated.

In step S211, the control unit 107 re-sets a compression rate of the encoding unit 102. In a case where the magnification operation is performed by the user, an encoding distortion may be visible in the magnified image if the image is magnified at the high compression rate set in step S202. Thus, the compression rate is reduced in step S211 to thereby reduce the encoding distortion in the magnified image. Since the amount of data output from the image capturing unit 101 decreases as a result of the processing in step S210, the high frame rate is maintained even if a lower compression rate than the compression rate set in step S202 is set.

Figure 3C:
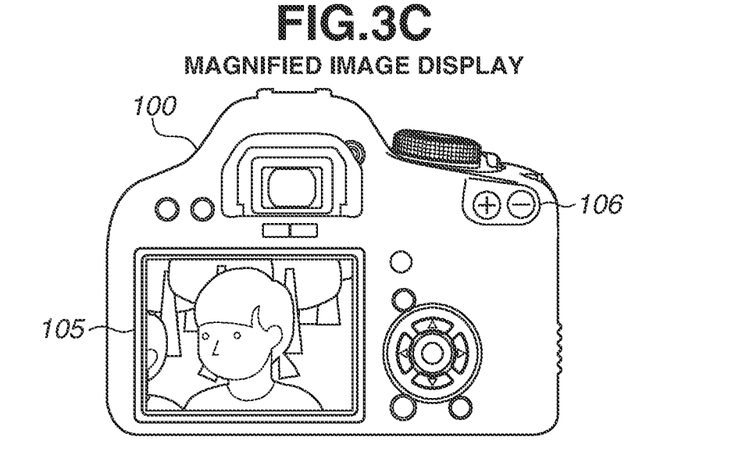

FIG. 3C illustrates a state where the magnified image is displayed after the reading region of the image sensor is re-set in step S210 and the compression rate is changed in step S211. Since a low compression rate is set in step S211, the encoding distortion originating from the encoding unit 102 in the image capturing element 111 is reduced even in the magnified image.

A control process of changing the compression rate of the encoding unit 102 based on the magnification rate to maintain a constant amount of data transmission from the sensor I/F and to reduce visibility of an encoding distortion in a magnified image display will be described below with reference to FIGS. 4A, 4B, and 5.

Figure 4A:
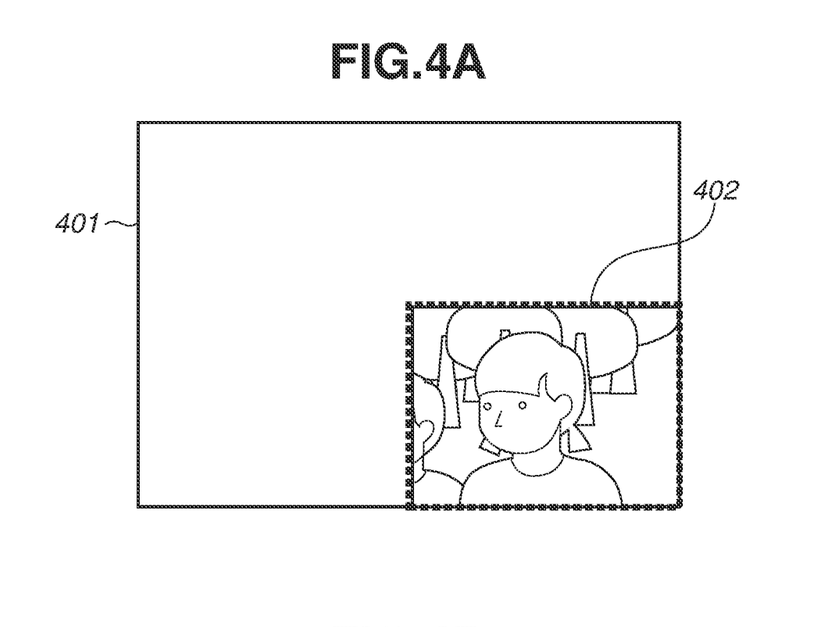
FIGS. 4A and 4B illustrate a reading region of a magnified image.

FIG. 4A illustrates a relationship between a maximum recording pixel region 401 that is recordable by the image sensor of the image capturing unit 101 and a magnification display region 402. In a normal display when no magnification operation is performed by the user, the control unit 107 displays an image captured by the maximum recording pixel region 401 in full screen on the display unit 105. In a case where, for example, the magnification operation is performed by the user, the magnification display region 402 having a size that is ¼ the size of the maximum recording pixel region 401 is magnified to be displayed in full screen on the display unit 105.

Figure 4B:
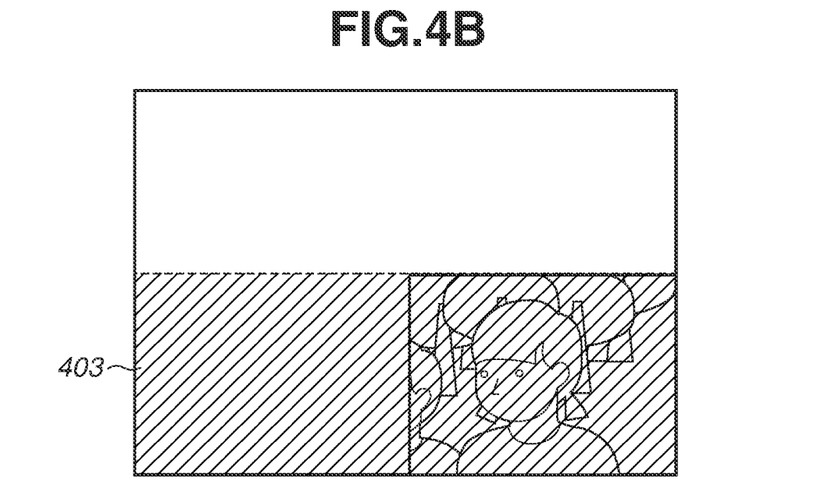

FIG. 4B illustrates a relationship between a reading region of the image sensor and a magnification display region in a magnified image display. A shaded portion in FIG. 4B indicates a sensor reading region of the image capturing unit 101 in a case where the magnification display region 402 is magnified and displayed. Even in a case where the length and the width of the magnification display region 402 are respectively ½ the length and the width of the maximum recording pixel region 401, the lengthwise direction needs to be entirely read since the length of a reading region 403 of the image sensor is the same as the length of the maximum recording pixel region 401.

Figure 5:
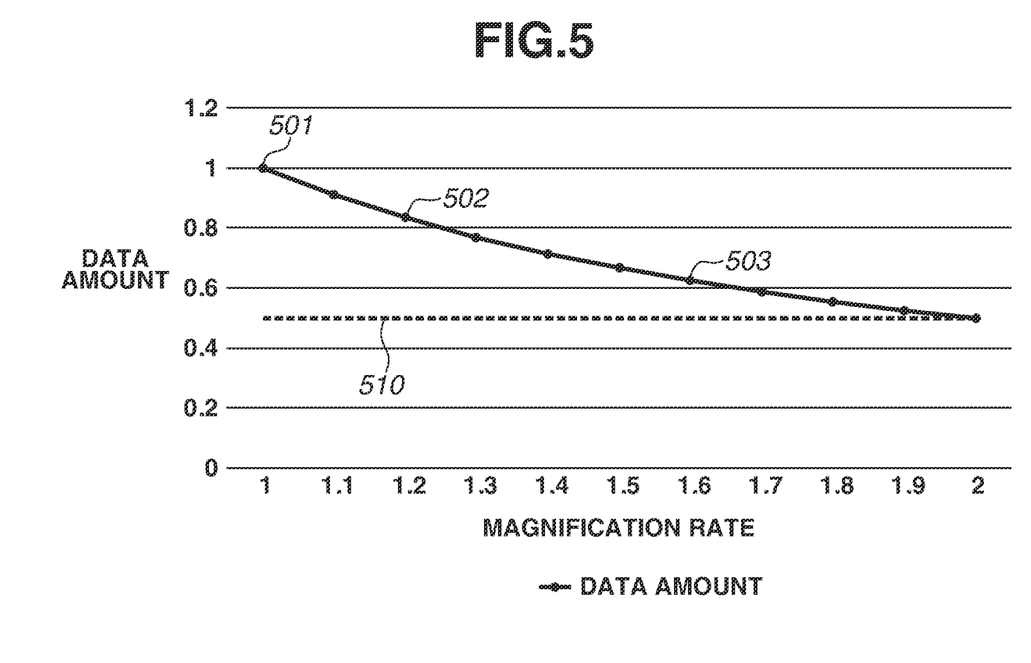
FIG. 5 illustrates a relationship between a magnification rate and a data amount.

FIG. 5 illustrates a relationship between a data amount in data transmission from the image capturing element 111 to the image processing unit 112 and a magnification rate in a case where the magnification operation is performed via the operation unit 106. A point 501 specifies a transmission data amount in a case where the magnification rate is 1, i.e., an image is not magnified, and the transmission data amount is defined as 1 in the present exemplary embodiment. This is a data amount in a case where an image of the entire maximum recording pixel region 401 in FIG. 4A is captured and the captured image is transmitted at a predetermined frame rate (e.g., 60 fps). Descriptions of a data amount hereinafter are based on the above-described data amount.

In the present exemplary embodiment, the amount of data that can be transmitted from the image capturing element 111 to the image processing unit 112 is limited, and a maximum transmission data amount 510, which is a limit value of the amount of data that can be transmitted per unit time, is 0.5, as illustrated in FIG. 5. The maximum transmission data amount 510 varies, for example, depending on whether power saving is intended or depending on a hardware specification. In the example illustrated in FIG. 5, in order to transmit data from the image capturing element 111 to the image processing unit 112 at the above-described frame rate in a case where no magnification operation is performed, the data amount needs to be compressed to ½. Thus, the compression rate is set to ½ in the initial setting of the compression rate in step S202 in FIG. 2.

Thereafter, in a case where the magnification operation is performed by the user to change the magnification rate to 1.2 times specified by a point 502, the transmission data amount is changed to 0.8, so that the compression rate is re-set to ⅝ in step S211. Further, in a case where the magnification operation is performed by the user to change the magnification rate to 1.6 times specified by a point 503, the transmission data amount is changed to 0.6, so that the compression rate is re-set to ⅘ in step S211.

As described above, according to the present exemplary embodiment, the amount of data transmission (frame rate) from the image capturing element 111 to the image processing unit 112 is set to be constant, and in a case where the magnification rate is increased, the compression rate is correspondingly reduced. Therefore, in a case where an image is magnified, the compression rate is reduced, so that the encoding distortion is less likely to occur and less likely to become visible.

A second exemplary embodiment of the present disclosure will be described below with reference to the drawings.

Figure 6:
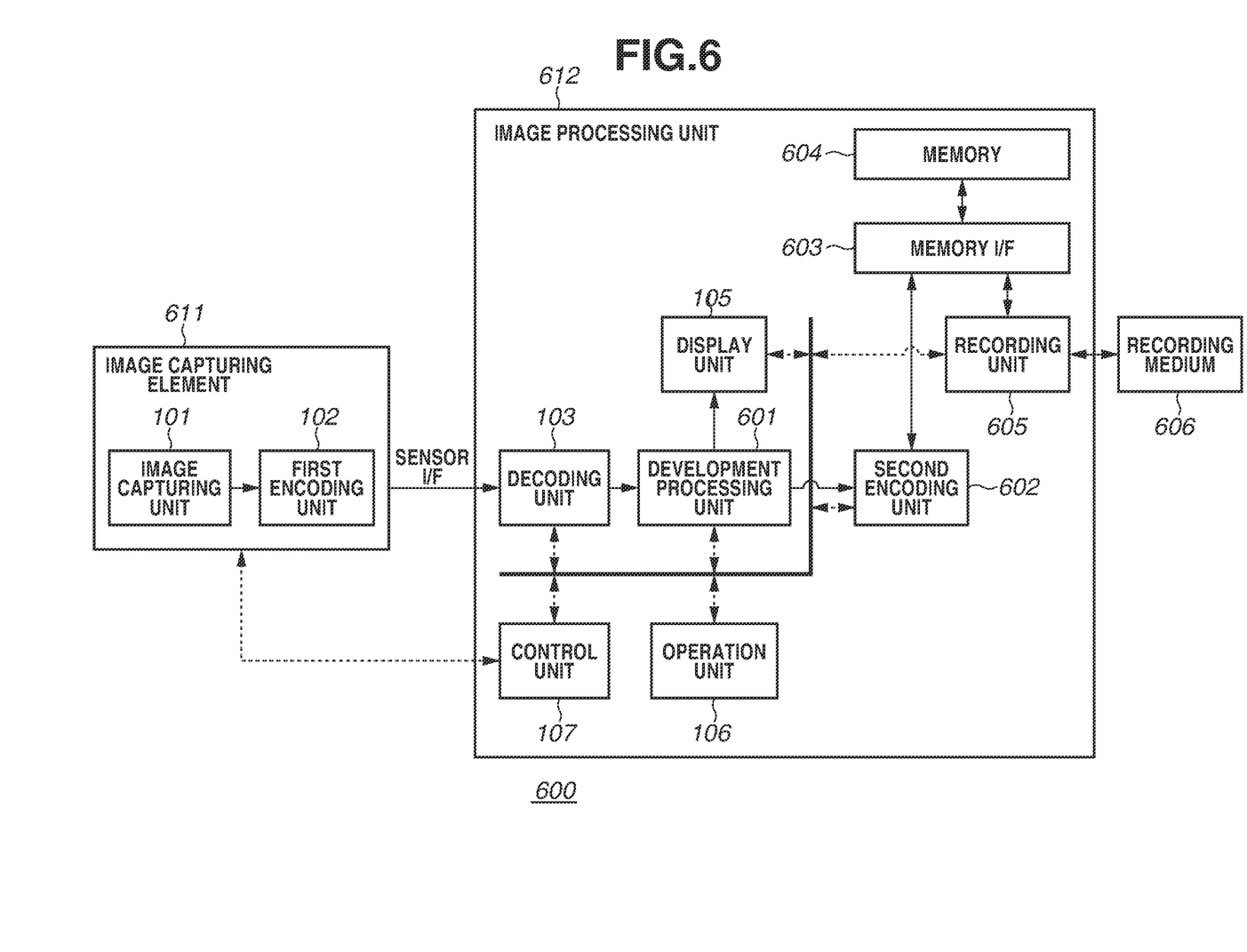
FIG. 6 is a block diagram illustrating an example of a configuration of an image capturing apparatus according to a second exemplary embodiment.

FIG. 6 is a block diagram illustrating an example of a configuration of an image capturing apparatus 600 according to the present exemplary embodiment. Only different configurations from those of the image capturing apparatus 100 illustrated in FIG. 1 will be described below, and descriptions of similar elements are omitted.

As illustrated in FIG. 6, the image capturing apparatus 600 includes an image capturing element 611 and an image processing unit 612. The image capturing element 611 includes the image capturing unit 101 and a first encoding unit 102. The image processing unit 612 includes the decoding unit 103, the display unit 105, the operation unit 106, the control unit 107, a development processing unit 601, a second encoding unit 602, a memory interface (memory I/F) 603, a memory 604, and a recording unit 605.

The development processing unit 601 performs basically the same processing as that of the development processing unit 104 in FIG. 1 and outputs developed image data to the display unit 105 and the second encoding unit 602. The second encoding unit 602 performs high efficiency encoding, such as H.264 or H.265, on input image data and outputs the encoded data to the memory I/F 603. The memory I/F 603 adjusts a request to access the memory 604 from the respective processing units and controls reading and writing of data from and to the memory 604. The memory 604 is a memory configured to store various types of data output from the processing units of the image capturing apparatus 600 and is, for example, a volatile memory. The recording unit 605 reads the encoded data stored in the memory 604 and records the read data on a recording medium 606. The recording medium 606 is an external recording medium configured to record data captured and encoded by the image capturing apparatus 600 and is, for example, a secure digital (SD) card.

Figure 7:
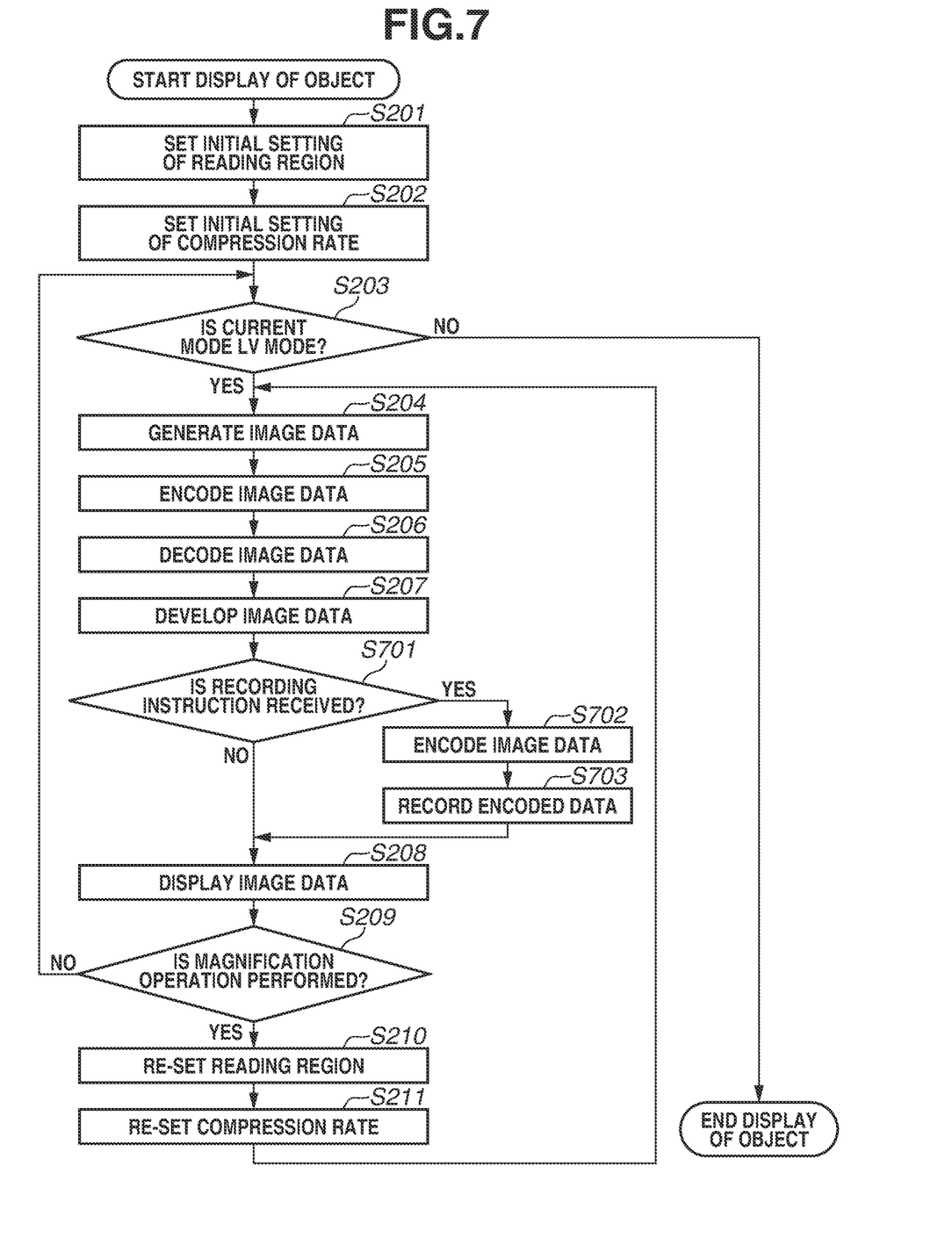
FIG. 7 is a flowchart illustrating an example of a process of displaying a magnified image of an object according to the second exemplary embodiment.

A process that is performed by the control unit 107 of the image capturing apparatus 600 will be described below with reference to a flowchart illustrated in FIG. 7. Descriptions of the processing that is also illustrated in the flowchart in FIG. 2 are omitted.

In step S701, the control unit 107 determines whether a shutter button of the operation unit 106 is fully pressed and a recording instruction is thereby received. In a case where the control unit 107 determines that a recording instruction is not received (NO in step S701), the processing proceeds to step S208. On the other hand, in a case where the control unit 107 determines that a recording instruction is received (YES in step S701), the processing proceeds to step S702.

In step S702, the second encoding unit 602 encodes the developed image data. Then, in step S703, the memory OF 603 stores the encoded data in the memory 604. Then, the recording unit 605 records the encoded data (image data) on the recording medium 606.

As described above, in a case where a magnification operation is performed by the user, the compression rate of the first encoding unit 102 is changed based on the magnification rate as in the first exemplary embodiment. Thus, in a case where a recording instruction is received after a magnification operation is performed, image data on a magnified image is stored in the memory 604, and thereafter the recording unit 605 records the image data on the recording medium 606.

As described above, according to the present exemplary embodiment, in a case where a magnified image is to be recorded, a magnified image that is less likely to cause an encoding distortion is recorded. While steps S702 and S703 are performed prior to step S208 in the present exemplary embodiment, step S208 can be performed prior to or in parallel with steps S702 and S703.

Embodiments of the present disclosure reduce visibility of an encoding distortion in a magnified image display while preventing an increase in data amount.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-151862, filed Aug. 22, 2019, which is hereby incorporated by reference herein in its entirety.

What is claimed is:

1. An image capturing apparatus comprising:
   an image capturing unit configured to capture an image of an object and generate image data;
   a compression unit configured to compress the image data generated by the image capturing unit;
   a display control unit configured to decode the image data compressed by the compression unit and display the decoded image data on a display unit; and
   an instruction unit configured to issue an instruction to magnify an image to be displayed on the display unit,
   wherein, in a case where the instruction unit issues the instruction to magnify the image to be displayed on the display unit, the compression unit reduces a compression rate of the image data.

2. The image capturing apparatus according to claim 1, wherein the compression unit reduces the compression rate of the image data based on a specified magnification rate of the image.

3. The image capturing apparatus according to claim 2, wherein the compression unit reduces the compression rate of the image data as the specified magnification rate is increased.

4. The image capturing apparatus according to claim 1, further comprising a setting unit configured to reduce a reading region of an image sensor of the image capturing unit, in the case where the instruction to magnify the image to be displayed on the display unit is issued by the instruction unit,
   wherein the compression unit reduces the compression rate of the image data on the reading region reduced by the setting unit.

5. The image capturing apparatus according to claim 1, wherein, in a case where the instruction unit issues the instruction to magnify the image to be displayed on the display unit, the compression unit reduces the compression rate of the image data while maintaining a data amount of the image data.

6. The image capturing apparatus according to claim 1, wherein the display control unit includes:
   a decoding unit configured to decode the image data compressed by the compression unit; and
   a processing unit configured to develop the image data decoded by the decoding unit, and
   wherein the display control unit displays the image data developed by the processing unit on the display unit.

7. The image capturing apparatus according to claim 6, further comprising:
   an encoding unit configured to encode the developed image data; and
   a recording unit configured to record the image data encoded by the encoding unit on a recording medium.

8. The image capturing apparatus according to claim 1, wherein the instruction unit issues an instruction to reduce an image to be displayed on the display unit, and
   wherein, in a case where the instruction unit issues the instruction to reduce the image to be displayed on the display unit, the compression unit increases a compression rate of the image data.

9. A method of controlling an image capturing apparatus, the method comprising:
   compressing image data generated by an image capturing unit;
   performing display control to decode the image data compressed in the compressing and display the decoded image data on a display unit;
   issuing an instruction to magnify an image to be displayed on the display unit; and
   based on the instruction to magnify the image to be displayed on the display unit being issued by the issuing, reducing a compression rate of the image data in the compressing.

10. A non-transitory computer-readable storage medium storing a program for causing a computer to execute a method of controlling an image capturing apparatus, the method comprising:
   compressing image data generated by an image capturing unit;
   performing display control to decode the image data compressed in the compressing and display the decoded image data on a display unit;
   issuing an instruction to magnify an image to be displayed on the display unit; and
   based on the instruction to magnify the image to be displayed on the display unit being issued by the issuing, reducing a compression rate of the image data in the compressing.

* * * * *